United States Patent [19]

Gauthier et al.

[11] Patent Number: 4,493,720

[45] Date of Patent: Jan. 15, 1985

[54] PROCESS FOR PRODUCING DOPED VITREOUS SILICA FOR PREPARING A PREFORM FOR AN OPTICAL FIBRE

[75] Inventors: Francis Gauthier; Jean Gombert, both of Paris, France

[73] Assignee: Thomson-CSF, Paris, France

[21] Appl. No.: 464,556

[22] Filed: Feb. 7, 1983

[30] Foreign Application Priority Data

Feb. 9, 1982 [FR] France .................. 82 02053

[51] Int. Cl.³ ............ C03C 15/00; C03B 37/01; C03B 23/00
[52] U.S. Cl. ......................... 65/3.12; 65/2; 65/3.11; 65/3.15; 65/18.1; 65/31; 427/34; 427/166
[58] Field of Search ........... 427/34, 168, 423, 166; 65/3.11, 3.12, 3.13, 3.15, 18.1, 18.2, 31, 2; 501/37, 54

[56] References Cited

U.S. PATENT DOCUMENTS

| | | | |
|---|---|---|---|
| 3,457,102 | 7/1969 | Grekila et al. | 427/423 X |
| 3,592,619 | 7/1971 | Elmer et al. | 65/31 X |
| 3,650,721 | 3/1972 | Hammel et al. | 65/3.15 X |
| 3,954,431 | 5/1976 | Fleming et al. | 427/423 X |
| 4,165,222 | 8/1979 | Panafieu et al. | 65/31 X |

FOREIGN PATENT DOCUMENTS 2368444  5/1978  France .

Primary Examiner—Kenneth M. Schor
Attorney, Agent, or Firm—Oblon, Fisher, Spivak, McClelland & Maier

[57] ABSTRACT

The invention relates to a process for producing ultrapure doped vitreous silica for producing a preform for optical fibres. According to the invention, an ultrapure porous glass, glass obtained after its shaping, is used as the crude starting material in a deposition process of the plasma torch, grain by grain Verneuil type, for example, in order to complete a preform obtained by said process for the separation of phases and acid washing or etching of the glasses.

21 Claims, 12 Drawing Figures

PROCESS FOR PRODUCING DOPED VITREOUS SILICA FOR PREPARING A PREFORM FOR AN OPTICAL FIBRE

BACKGROUND OF THE INVENTION

The invention relates to light conducting glass fibres and more particularly to the production of glass used in the preparation of preforms for optical fibres. Numerous optical fibres production processes are known in the art.

Certain of them, like the process called "modified chemical vapour deposition" or M.C.V.D, produce fibres with very high performance levels but which are expensive, because the deposition speeds are low. Others like "grain by grain" plasma deposition have high deposition speeds, but do make it possible to produce very high performance fibres (very low attenuation, linked with very high pass bands) due to the difficulties encountered in producing highly doped glass by this method.

French Pat. No. 2,368,444, relating to the so-called "separation of phases and washing" or S.P.L. process, filed by the present Applicant, describes a process for the separation of the phases and for the acid washing or leaching of the glass in order to produce optical fibre preforms made from very high purity glass. The S.P.L. process is used for producing glass fibres with a radial refractive index gradient involving the prior production of a blank having a diameter greater than that of the fibre, as well as the following stages:

- a first stage consisting of mixing the starting substances liable to be involved in a glass composition having the separation phenomenon in two solid interconnected and continuous phases of different compositions, the said starting substances having an impurity level below $10^{-5}$, calculated by taking account of the molar proportions of the so-called transition metal oxides, said first stage then involving the preparation of a molten glass bath;
- a second stage involving a first stage of drawing the blank at a predetermined speed from the glass bath through a cooling device having a predetermined thermal gradient, and a third stage involving at least one thermal annealing process; and
- a another stage involving at least one washing or leaching operation to eliminate the phase containing most impurities, as well as a thermal drying and consolidation treatment of the blank.

One of the limitations of this process is that the glass blanks to a certain degree break in the case of acid washing. Another limitation is that it is difficult to produce optical sheets in a reproducible manner by the chemical method.

BRIEF SUMMARY OF THE INVENTION

The present invention aims at obviating these disadvantages by obtaining highly doped glass by a rapid deposition process. It is possible to produce doped glasses having a variable composition which make it possible to rapidly obtain various fibre structures.

Due to the fact that the process for producing the fibres according to the invention uses a glass powder, it has the advantages of the S.P.L. process, without suffering from its technical limitations. Thus, there is no need according to the present the invention to produce cylindrical rods having a strictly defined geometry. The control of phase separation initiation is ensured by casting at high temperature and the subsequent hardening process. Production efficiency is not limited by breaking taking place at the time of washing and drying.

The invention more specifically relates to a process for the production of doped vitreous silica intended for the preparation of a preform for an optical fibre of the type involving the following stages;

- a first stage of melting a doped composition, for example, a doped borosilicate composition, having a mixture of oxides and carbonates, whose initial composition makes it possible to induce, by annealing, a separation of phases with an interconnected structure due to spinodal decomposition and of refining the said glass in order to obtain a homogeneous, bubble-free glass;
- a second stage of controlling the initial phase separation;
- a third stage of annealing the said glass in order to induce the separation of the phases by spinodal decomposition, which then makes it possible to obtain a hard phase formed from silica and at least one doping oxide and a soft phase composed of oxides including at least boron and sodium oxides, the two phases being interconnected;
- a fourth stage of etching the said glass with basic acid mixtures or solutions, which may contain salts or complexing agents in order to dissolve the soft phase and obtain a porous glass essentially constituted by the hard phase;
- a fifth stage of rinsing said porous glass with distilled water in order to eliminate elements from the soft stage;
- wherein in the second stage of controlling the initial phase separation the glass is formed or shaped and hardened in order to control the initial phase separation by pouring it into moulds or onto plates, whereby said process also involves,
- a sixth stage of drying the glass by slowly raising the temperature to that making it possible to retain an open porosity 60% higher than the initial porosity;
- and a seventh stage of producing a powder from said porous glass.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
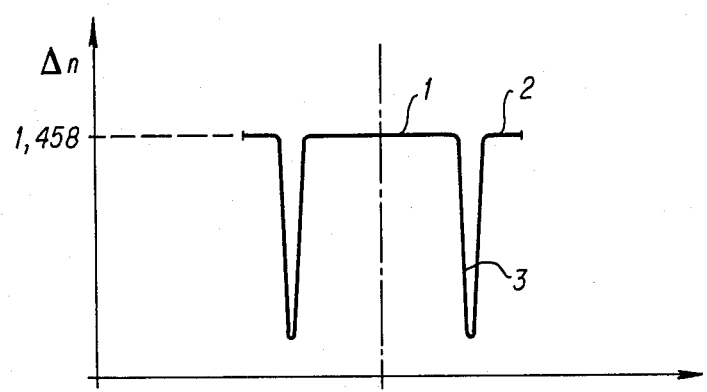
FIGS. 1 and 2 index profile curves of prior art optical fibres.

One of the major difficulties of the S.P.L. process occurs at the time of shaping the cylindrical blank from an alkaline borosilicate melt, which is highly doped, e.g. by an oxide such as germanium dioxide $GeO_2$. It is necessary to obtain rods having a perfectly circular cross-section and a homogeneous composition, which has neither bubbles nor unmelted portions, which has also undergone no phase separation. Following an adequate annealing in order to produce a spinodal structure by controlled phase separation, said blank is washed with acid, with an approximately 30% probability of breaking during this process, in order to obtain a doped porous glass rod.

A complex chemical treatment makes it possible to produce an optical sheath. Following a long drying stage (10 to 400 hours), when risks of breaking still exist, the porous glass is shaped at high temperature in order to obtain an index gradient multimodal fibre preform. The fibre is obtained by a conventional fibre formation process from the said preform.

The invention proposes to use an ultrapure porous glass or a glass obtained after shaping as the crude starting material for replacing the starting material, such as the powder of silica $SiO_2$, germanium dioxide $GeO_2$, boron trioxide $B_2O_3$, etc, used in certain processes, e.g. in grain by grain deposition by plasma torch, or for replacing halide gases in the case of "plasma chemical vapour deposition" or P.C.V.D.

For example, in the prior art, the "grain by grain" deposition by plasma torch made it possible to obtain from pure silica grains (natural quartz or synthetic quartz) a very large cylindrical ingot (diameter equals $n \times 10$ cm, length equals $n \times 100$ cm) made from ultrapure silica glass with high deposition rates. This ingot makes it possible to produce the core of preforms for optical fibres having the profile described in FIG. 1, in which 1 represents the pure silica core, 2 the pure silica mechanical sheath and 3 the e.g. fluorine-doped optical sheath. C represents the centre of the preform. The value 1.458 is the value of the pure silica index.

In order to produce this preform from the ingot constituting core 1, it is also necessary to produce an optical sheath 3, e.g. by longitudinally depositing a fluorine-doped glass by a plasma process using a gaseous phase oxidation reaction based on halides.

Figure 2:
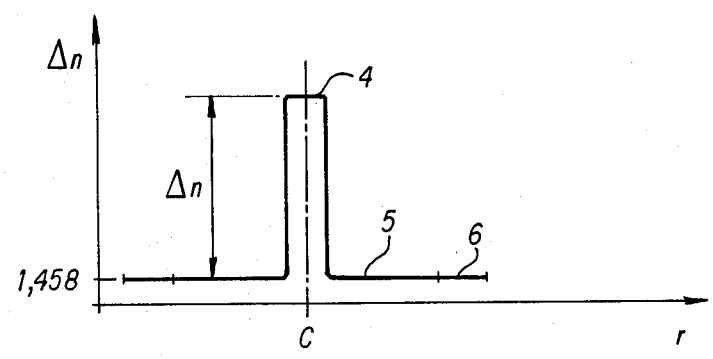

In order to obtain a better guidance structure than that described in FIG. 1, it is advantageous to produce a profile of the type shown in FIG. 2, in which 4 represents the silica core doped e.g. with germanium dioxide, 5 the optical sheath and 6 the mechanical sheath. These two sheaths can be made from the same material, e.g. silica.

Thus, in the structure profile described relative to FIG. 1, the rapid diffusion of the fluorine does not make it possible to obtain a sudden index jump required for controlling the core of monomodal fibres. It is only possible to produce multimodal fibres with a low pass band.

In order to realise the structure of FIG. 2, it is necessary to be able to strongly dope the silica in order to form the core.

A limitation of the grain by grain process is that it is not possible to obtain an appropriately doped silica ingot. It is not possible to incorporate into the glass a sufficiently high dopant quantity to increase the refractive index of the glass compared with that of pure silica. Moreover, it is not possible to control the reproducibility of the dopant content obtained. The reason is that the dopants have a lower vapour tension than silica and evaporate at a very high temperature in the plasma. It is not possible with this method to dope the silica with substances increasing the index, such as germanium, phosphorus, barium, cesium, aluminium and lead.

The present invention provides the means for producing the doping of the core in order to obtain the structure of FIG. 2.

In table 1, at the end of the description, A indicates the range of basic glasses for the preform glass of the process according to the invention, B an example of a typical composition and C two examples of compositions of the washed glass with which the preform is then produced.

A number of examples will be given in nonlimitative manner hereinafter.

EXAMPLE I

This example illustrates the use of a doped glass obtained by phase separation as the starting material in a plasma torch, grain by grain, Verneuil-type deposition process in order to sheath a S.P.L. preform.

A borosilicate is prepared, whose dopant content, e.g. germanium dioxide, can range from 0 to 33 molar %. The borosilicate is melted from the mixture of oxides and carbonates, followed by the refining thereof in order to obtain a homogeneous, bubble-free glass.

The glass is shaped and hardened in order to control the initial phase separation by pouring it into moulds or onto plates. It is not necessary to obtain a specific geometry, but the use of thicknesses below 2 cm is recommended. It is also possible to form balls. This glass is annealed in order to induce the separation of the phases by spinodal decomposition. A hard phase then forms, which consists of silica and doping oxide, e.g. germanium dioxide, as well as a soft phase formed from oxides consisting at least of boron and sodium oxides. The two phases are interconnected.

The glass is etched with acids in order to dissolve the soft phase and obtain a porous glass essentially constituted by the hard phase. The porous glass is rinsed with distilled water in order to eliminate elements from the soft phase.

This glass is dried by slowly raising the temperature to 700° C. approximately, whilst applying to said glass a high vacuum or a circulation of dry gas. The temperature is slowly raised to that making it possible to obtain an open porosity 60% higher than the initial porosity.

It is possible either to use a powder formed by grinding porous glass with a controlled grain size spectrum, or to shape the porous glass in order to form a powder therefrom, after grinding. In both cases, the glass obtained has an identical composition and only the density of the powder differs.

As a function of the proportions of the oxides used in the initial borogermanosilicate glass, or basic glass, it is possible to obtain glasses having a germanium content between 0 and 33%. As a result, the optical fibres obtained from these glasses can have numerical apertures of 0.24, taking account of the index differences of $2 \times 10^{-2}$ between the core glass and the sheath glass.

By acting on the acid washing time, it is possible to accurately adjust the germanium content of the washed glasses, because the germanium dioxide is very slowly etched by certain acids or mixtures, such as nitrohydrochloric acid.

As a function of the nature of the dopants and the etching medium, it is also possible to finely adjust the dopant content of the washed glasses. The nature of the etching medium can be organic or mineral acids, water or bases and salts or complexing agents can be added thereto.

Figure 3:
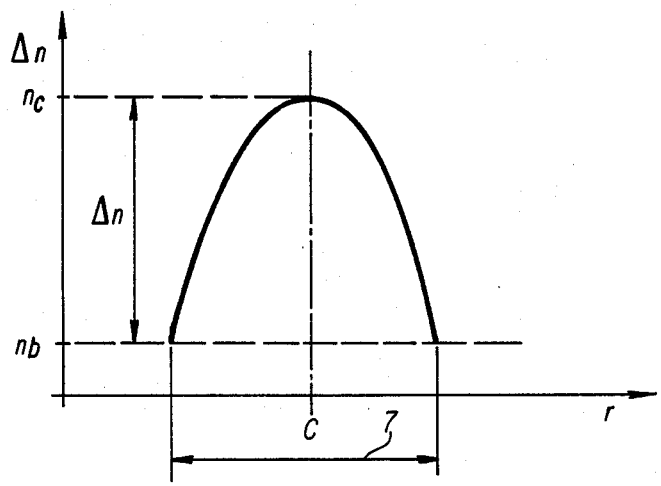
FIG. 3 an index profile curve of optical fibres of the S.P.L type.

By using a plasma torch with the glass powder produced in this way, it is possible to obtain a homogeneous optical glass. The glass powder particles pass through the flame of the plasma torch regulated to the appropriate oxidoreduction conditions for the chosen glasses. They are heated by the latter and are at the same time entrained in order to form fine droplets of dense, shaped glass dehydrated by the high temperature of the flame. These glass droplets are projected onto a target, where they agglutinate to form a homogeneous glass layer. For example, the target can be a S.P.L. type preform 7, whose structure or index profile is shown in FIG. 3, in which r represents its radius and $\Delta n$ the difference between the indices of the core and the sheath, $n_c$ being the core index of the preform and $n_b$ the index of the edge of said preform.

Figure 4:
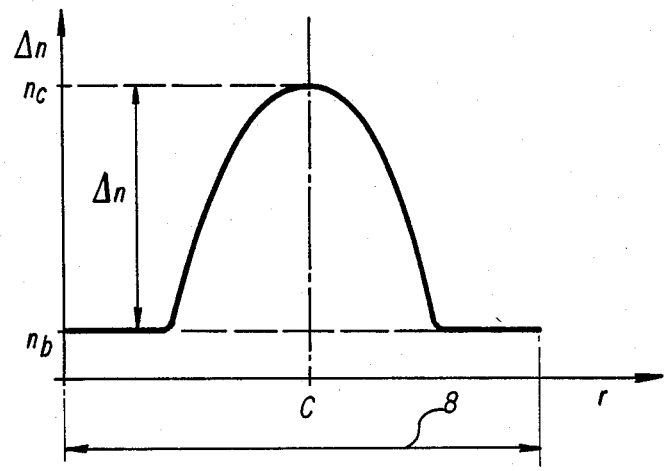
FIG. 4 an index profile curve of an S.P.L. fibre sheathed according to the present invention.

By depositing an adequate number of glass layers, whose index is $n_b$, it is possible to produce a multimodal fibre structure, like that shown in FIG. 4, in which 8 represents the preform with an optical sheath.

The preform obtained can be chemically polished with hydrofluoric acid and/or flame polished to eliminate its surface defects. In this way, fibres with a better mechanical strength are obtained.

EXAMPLE II

Figure 5:
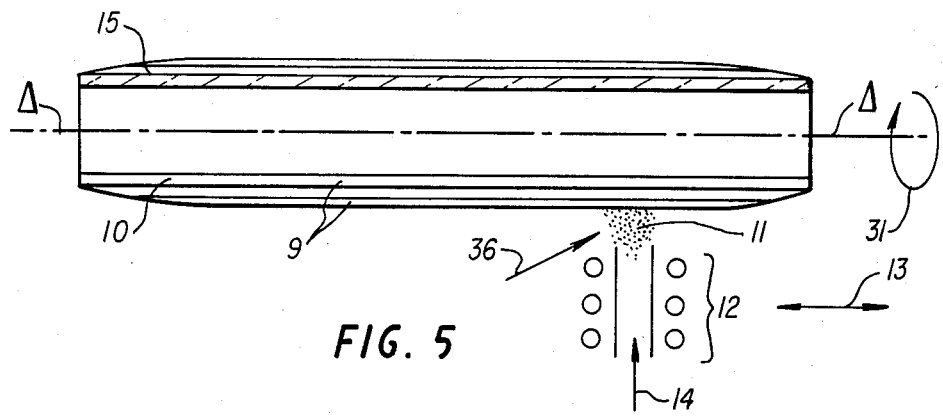
FIG. 5 the production of a preform according to the invention.

This example illustrates the production of a complete preform by the Verneuil process shown in FIG. 5 based on the glasses according to the invention. A plasma torch 12 is e.g. used as the heating means and in the present case said torch is inductive. The target is a thin pure silica tube 10 in rotation 31 in FIG. 5. The plasma torch 12 moves in translation 37. Deposition takes place in successive layers 9 of glasses 11 having a germanium content making it possible to obtain the index profiles described relative to FIGS. 6 and 7. 14 represents the inflow of the glass powder mixed with a plasmagenic gas into plasma torch 12, whilst 15 represents the surface of tube 10.

The glass powder can be introduced at 36 and can be injected at 14 or 36, or both 14 and 36.

Figure 6:
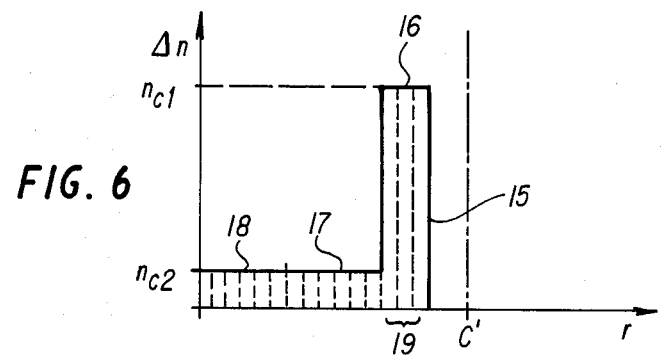
FIGS. 6 and 7 index profile curves of optical fibres obtained by the process illustrated in FIG. 5.
Figure 7:
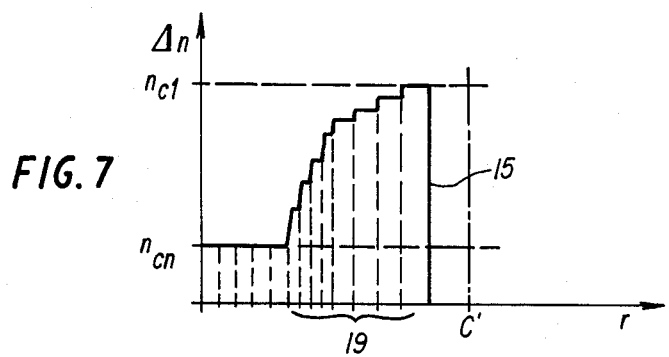

In FIGS. 6, and 7, $n_{c1}$ represents the index of the glass of composition $C_1$, i.e. the core, and $n_{c2}$ and $n_{cn}$ the indices of the glasses of compositions $C_2$ and $C_n$, i.e. layers 2 and n of the sheath. C' corresponds to the centre of the support tube 10, i.e. to the axis of symmetry $\Delta$ of FIG. 5.

In FIG. 6, the doped glass core 16 is formed from one or more layers 19 of glass having an identical composition $C_1$, whilst 17 represents the optical sheath and 18 the mechanical sheath.

In FIG. 7, several layers 19 of glasses doped at different concentrations for forming the preform core have been deposited.

When deposition is ended, partial shaping takes place, followed by the etching of the silica target tube via the central channel using acid, e.g. hydrofluoric acid until it has finally dissolved. The tube obtained is then completely shaped in order to obtain a rod constituting the preform.

Figure 8:
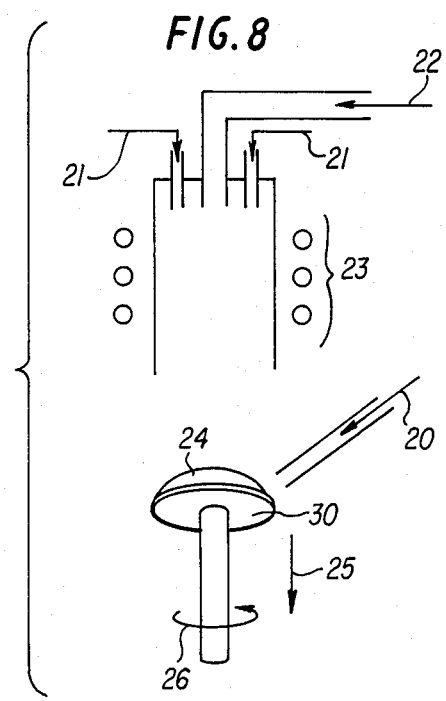
FIGS. 8 to 12 processes for the production of preforms from glass according to the invention.

In FIG. 8, the target is a circular silica plate 30 in rotation 26 and in translation 25. The glass powder is brought axially 22 or laterally 20 into the torch. The growth 24 of the preform is axial. It is then possible to simultaneously grow the core and the sheath and also by projecting two different glasses, one of them to the centre of the target and the other to the periphery.

At 21 is injected a plasmagenic gas and at 22 a glass of composition $C_1$, as well as at 20 a glass of composition $C_2$. It is then possible to axially displace(25) plate 30 in rotation 26, which permits the continuous growth 24 thereon.

EXAMPLE III

Production of a preform from glasses according to the invention by fitting and shaping the powders.

Figure 9:
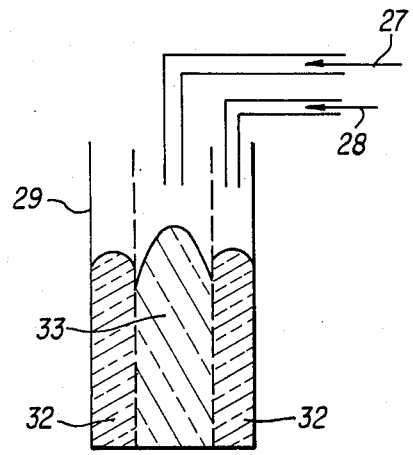

As shown in FIG. 9, two glass powders can be simultaneously introduced into a porous tube 29. The powder of composition $C_1$ flows in the centre 33 forming a cone, whilst the powder of composition $C_2$ flows in a ring 32. By controlling the respective flow rates, it is possible to fill the tube in such a way that a cylinder is obtained of composition $C_1$ and a ring of composition $C_2$. This is followed by drying and shaping the porous glasses under high vacuum or a circulation of dry gas, e.g. halogenated oxygen, by slowly increasing the temperature until the glass is completely densified.

Figure 10:
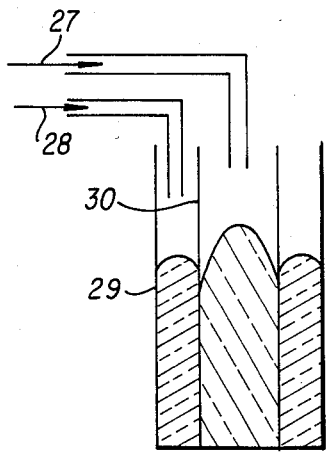

In FIG. 10, there is within tube 29, a tube 30 which is concentric to the first tube and which makes it possible to realise the flow of the two powders as in FIG. 9. Tube 30 is removed after filling, or progressively during filling.

Figure 11:
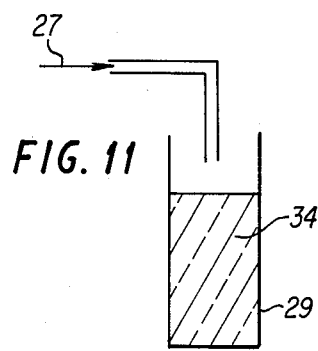
Figure 12:
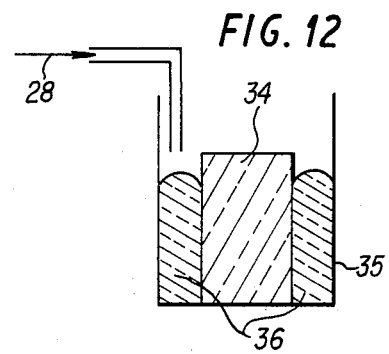

A variant for forming this preform involves the use of binders. In the manner shown in FIG. 11, the core is formed with glass $C_1$ by filling the binder-impregnated powder into a cylindrical mould 29. Cylinder 34 is removed from the mould and is placed in the manner shown in FIG. 12 in the centre of a larger diameter cylindrical mould 35, the free ring 36, between the mould wall and the first cylinder wall, being filled with glass powder $C_2$ 28. This is followed by mould removal, drying and shaping in accordance with the S.P.L. process.

Thus, the process according to the invention makes it possible to:

dope silica with germanium and/or other dopants referred to hereinbefore, because these are entirely bonded into the already formed glass and there is no risk of them escaping by volatilization during subsequent treatment;

choosing the dopant concentration level in the glasses obtained, so that a complete scale of indexes is available making it possible to form preforms and fibres with different $\Delta n$ values, i.e. different numerical apertures, whilst in particular it is possible to produce multimodal and unimodal fibres;

produce fibres with high deposition or production rates;

benefit from the purification effect of the phase separation.

The starting material can be produced in large quantities.

Bearing in mind the variable dopant concentrations in these glasses, it is possible to achieve index $\Delta n$ differences of $2 \times 10^{-2}$, i.e. a digital aperture ON of $ON = \sqrt{2n\Delta n}$, n being the average index and $\Delta n$ the index difference between the core and the sheath, i.e. $ON = 0.24$.

However, the content of $OH^-$ ions and the presence of a small quantity of boron trioxide $B_2O_3$ increase the attenuation at high wavelengths in the infrared at 1.3 and 1.55 microns.

These glasses can be used for windows at 0.85 and 1.06 microns.

TABLE I

A. Range of molar compositions of basic glasses (doped borosilicates)

| | | |
|---|---|---|
| Silica | $SiO_2$: 40 to 70% | ⎫ |
| Boron trioxide | $B_2O_3$: 10 to 55% | ⎬ Basic borosilicate glass |
| Sodium oxide | $Na_2O$: 0 to 20% | ⎬ |
| Potassium oxide | $K_2O$: 0 to 20% | ⎭ |
| Germanium dioxide | $GeO_2$: 0 to 33% | ⎫ |
| Aluminium oxide | $Al_2O_3$: 0 to 6% | ⎬ |
| Barium oxide | $BaO$: 0 to 10% | ⎬ dopants |
| Lead oxide | $PbO$: 0 to 30% | ⎬ |
| Phosphorus pentoxide | $P_2O_5$: 0 to 15% | ⎭ |

B. Typical composition of a five component alkaline borogermanosilicate

| | |
|---|---|
| Silica | $SiO_2$: 54% |
| Germanium dioxide | $GeO_2$: 10% |
| Boron trioxide | $B_2O_3$: 28% |
| Sodium oxide | $Na_2O$: 5% |
| Potassium oxide | $K_2O$: 3% |

C. Typical compositions obtained after

| | |
|---|---|
| Silica | $SiO_2$: 80% : 65% |
| Germanium dioxide | $GeO_2$: 16% : 33% |
| Boron trioxide | $B_2O_3$: 4% : 2% |
| Sodium oxide | $Na_2O$: traces : traces |
| Potassium oxide | $K_2O$: traces : traces |

What is claimed is:

1. A process for the production of doped vitreous silica and the preparation of a preform for an optical fiber, which process comprises:
   (a) melting a dopant-containing batch mixture of oxides and carbonates, which is capable of forming a glass, having a composition such that a separation of phases in the resultant glass is induced by annealing the resultant glass, and such that said separated phases have an interconnected structure due to spinodal decomposition, and refining the molten glass resulting from the melting to obtain a homogeneous, bubble-free glass melt;
   (b) forming or shaping said melt and hardening it, to provide a homogeneous glass;
   (c) annealing said homogeneous glass, thereby producing a spinodal structure by phase separation, and wherein there is formed a hard phase of silica and at least one doping oxide, and a soft phase comprising the oxides of at least boron and sodium, said phases being interconnected;
   (d) etching said glass with one or more mineral acids, thereby dissolving said soft phase to obtain a porous glass consisting essentially of said hard phase;
   (e) rinsing said porous glass with distilled water to eliminate elements from said soft phase;
   (f) drying said glass by slowly raising the temperature, such that an open porosity is obtained which is 60% higher than the initial porosity;
   (g) producing a powder from said porous glass; and
   (h) forming a fiber preform from the powder, by deposition of said powder, on a surface as a glass.

2. The process according to claim 1, wherein in drying the porous glass, the latter is placed in an enclosure under a high vacuum.

3. The process according to claim 1, wherein in drying the porous glass, the latter is placed in an enclosure in which at least one dry gas circulates.

4. The process according to claim 1, wherein said powder is obtained by grinding the glass, whereby the grain size is controlled.

5. The process according to claim 1, wherein said porous glass is shaped up to its total densification and the powder is produced from this shaped glass.

6. The process according to claim 1, wherein the mixture of oxides and carbonates comprises at least one dopant selected from the group consisting of germanium dioxide $GeO_2$, aluminum oxide $Al_2O_3$, lead oxide $PbO$, barium oxide $BaO$ and phosphorus pentoxide $P_2O_5$.

7. The process according to claim 6, wherein the dopant is germanium dioxide.

8. The process according to claim 6, wherein the doped mixture is a borosilicate glass, the borosilicate having a dopant content of 0 to 33 molar %.

9. The process according to claim 1, wherein the glass powder is exposed to a plasma torch treatment, the glass powder particles passing through the plasma torch flame, and said particles are heated by the latter and are at the same time entrained in order to form fine dense glass droplets, which are shaped and dehydrated by the high flame temperature.

10. The process according to claim 9, wherein the composition of the glass powder is changed during deposition, so as to deposit glasses having different compositions and indices.

11. The process according to claim 9, wherein said glass droplets are projected onto a target, where they agglutinate to form at least one homogeneous glass layer.

12. The process according to claim 11, wherein the target is a S.P.L. preform, on which is deposited a glass having a constant index in order to form an optical sheath.

13. The process according to claim 11, wherein the surface of the preform undergoes chemical polishing with hydrofluoric acid and then polishing with the aid of the torch flame.

14. The process according to claim 11, wherein the target is a thin tube in rotation and in translation and wherein successive glass layers are deposited.

15. The process according to claim 14, wherein after the deposition phase, a supplementary stage of partial shaping is effected and the the thin tube is etched with hydrofluoric acid until said tube is completely dissolved and shaped to obtain a preform.

16. The process according to claim 9, wherein the target is a circular silica plate in rotation and in translation, the glass powder being brought into contact with the plasma torch, the growth of the preform being axial, which makes it possible to simultaneously grow the core and the sheath.

17. The process according to claim 1, wherein after producing two glass powders of compositions designated as $C_1$ and $C_2$, said two powders are simultaneously made to flow into a porous tube, the powder of composition $C_1$ flowing in the center and forming a cone, while the powder of composition $C_2$ flows peripherally in order to obtain a cylinder of composition $C_1$ and a ring of composition $C_2$, the assembly is then dried and shaped, while increasing the temperature slowly in order to obtain the total densification of the glass.

18. The process according to claim 17, wherein the assembly is dried and shaped in an enclosure under a high vacuum.

19. The process according to claim 17, wherein the assembly is dried and shaped in an enclosure in which circulates at least one dry gas.

20. The process according to claim 1, wherein, after producing two glass powders of component $C_1$ and $C_2$, using binders, said core is formed with the glass of composition $C_1$ by filling binder-impregnated powder into a cylindrical mould, the cylinder obtained is then removed from the mould, placed in the centre of a larger diameter cylindrical mould and the free ring between the mould wall and the glass powder cylinder wall is filled with the glass powder of composition $C_2$, followed by mould removal, drying and shaping of the resulting assembly.

21. The process according to claim 5, wherein, after producing the two glass powders of compositions $C_1$ and $C_2$, said process using binders, said core is formed with glass of composition $C_1$ by filling binder-impregnated powder into a cylindrical mould, followed by the removal of the cylinder obtained from the mould, placing said obtained cylinder in the center of a larger diameter cylindrical mould and placing said glass powder of composition $C_2$ into the free ring between the mould wall and the first glass powder cylinder wall, to fill the same, removing the mold and, drying and shaping of the thus obtained assembly.

* * * * *